United States Patent

Simioni

[11] Patent Number: 5,526,070
[45] Date of Patent: Jun. 11, 1996

[54] NOSE PAD PARTICULARLY FOR SPECTACLE FRAMES

[75] Inventor: Luciano Simioni, Montebelluna, Italy

[73] Assignee: Killer Loop S.p.A., Pederobba, Italy

[21] Appl. No.: 378,140

[22] Filed: Jan. 24, 1995

[30]  Foreign Application Priority Data

Feb. 4, 1994 [IT] Italy ................. TV94A0010

[51] Int. Cl.⁶ ........................................ G02C 5/12
[52] U.S. Cl. ........................ 351/138; 351/136; 351/139
[58] Field of Search ........................... 351/136, 137, 351/138, 139, 41, 65, 78, 79, 80, 81, 82, 88, 126, 128, 148; 2/446

[56]  References Cited

U.S. PATENT DOCUMENTS

| | | | |
|---|---|---|---|
| 4,730,915 | 3/1988 | Jannard | 351/47 |
| 5,131,737 | 7/1992 | Pernicka | 351/88 |
| 5,369,451 | 11/1994 | Tamagawa | 351/136 |

FOREIGN PATENT DOCUMENTS

| | | |
|---|---|---|
| 0529202 | 3/1993 | European Pat. Off. . |
| 2472764 | 7/1981 | France . |
| 3714032 | 11/1988 | Germany . |
| 4206018 | 9/1993 | Germany . |

*Primary Examiner*—William L. Sikes
*Assistant Examiner*—Hung Xuan Dang
*Attorney, Agent, or Firm*—Guido Modiano; Albert Josif

[57]  ABSTRACT

Nose pad particularly for spectacle frames, which comprises a curved rigid element being shaped like an open triangle and has seats for temporarily engaging the frames. The nose pad comprises a first soft element that partially surrounds the rigid element and a second soft element which is associated with, and protrudes from, the ends of the rigid element. The second soft element is flexible towards the first soft element and has the same shape as the rigid element. This nose pad allows to reduce the surface in contact with the skin, improves ventilation, and cushions any accidental impacts without transmitting them to the nasal septum.

19 Claims, 5 Drawing Sheets

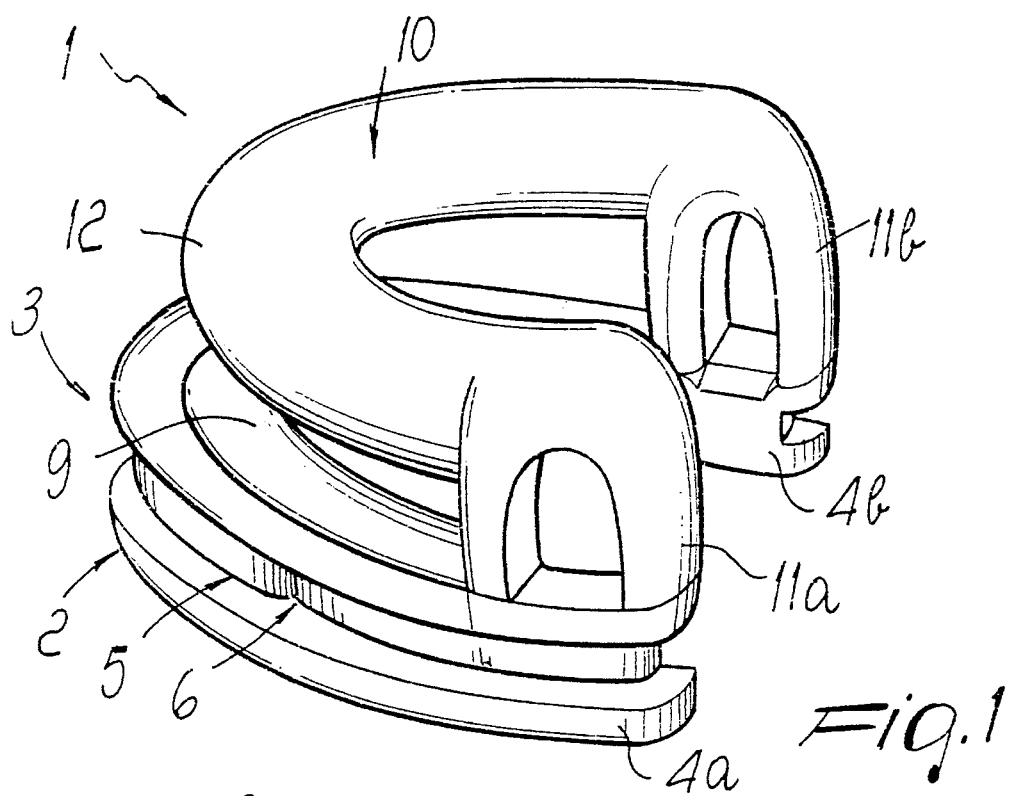
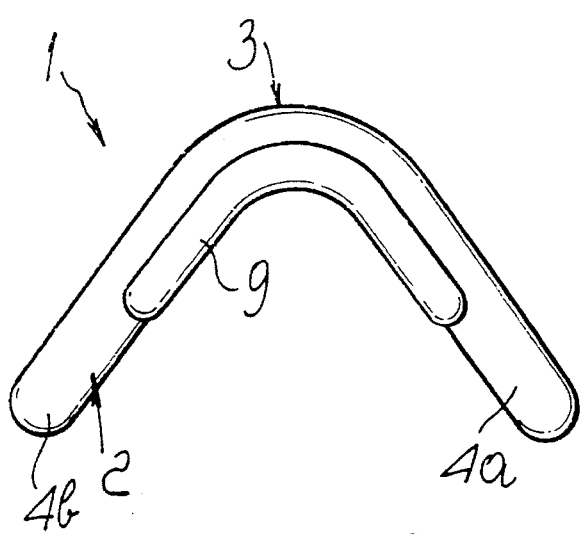
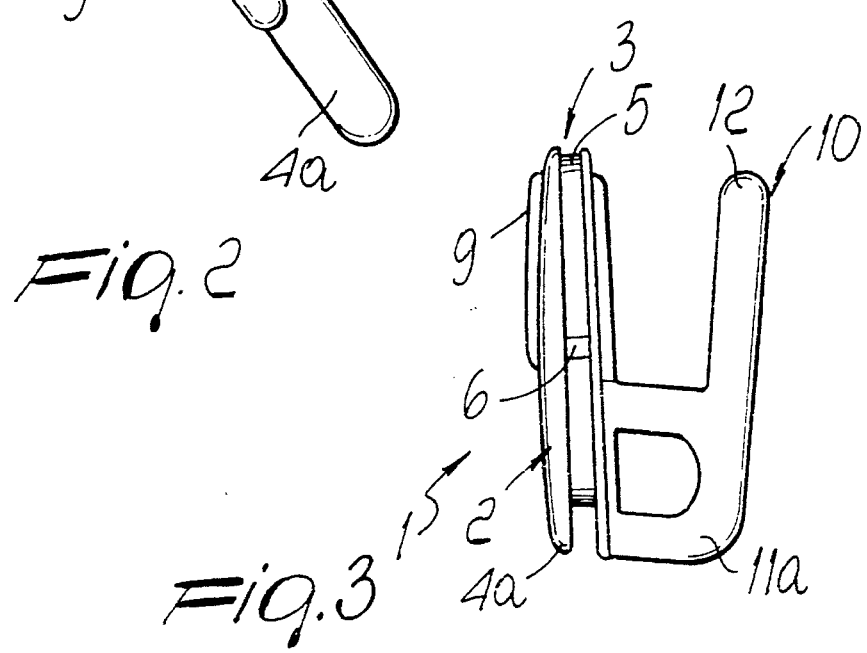

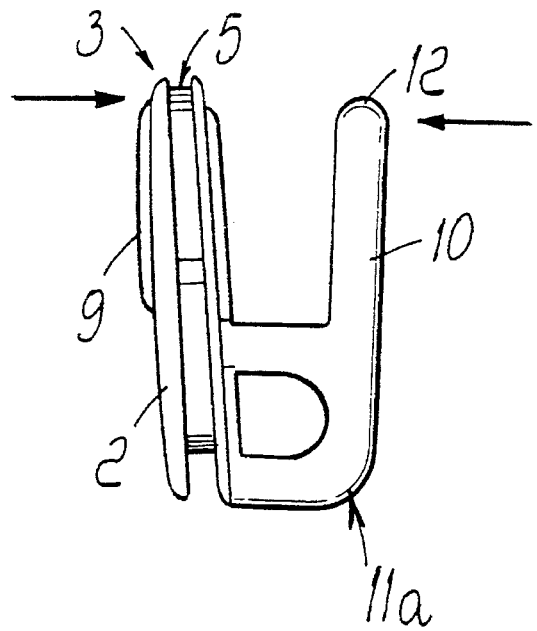
Fig. 4
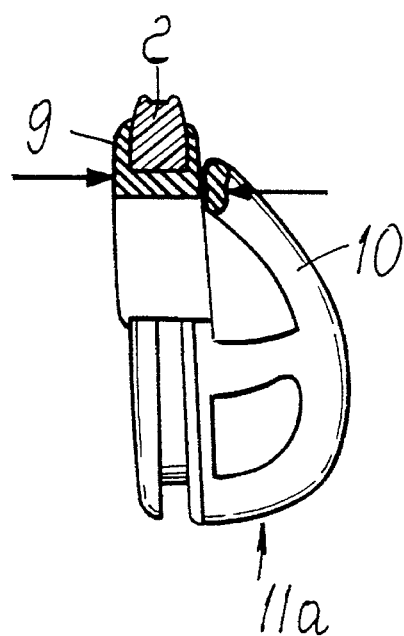
Fig. 6
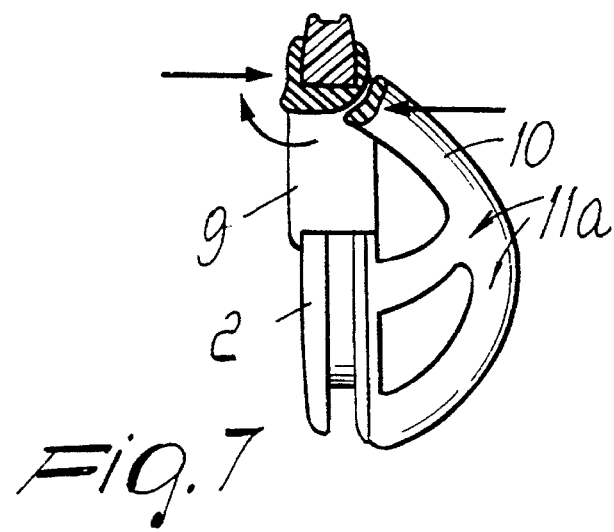
Fig. 5
Fig. 7

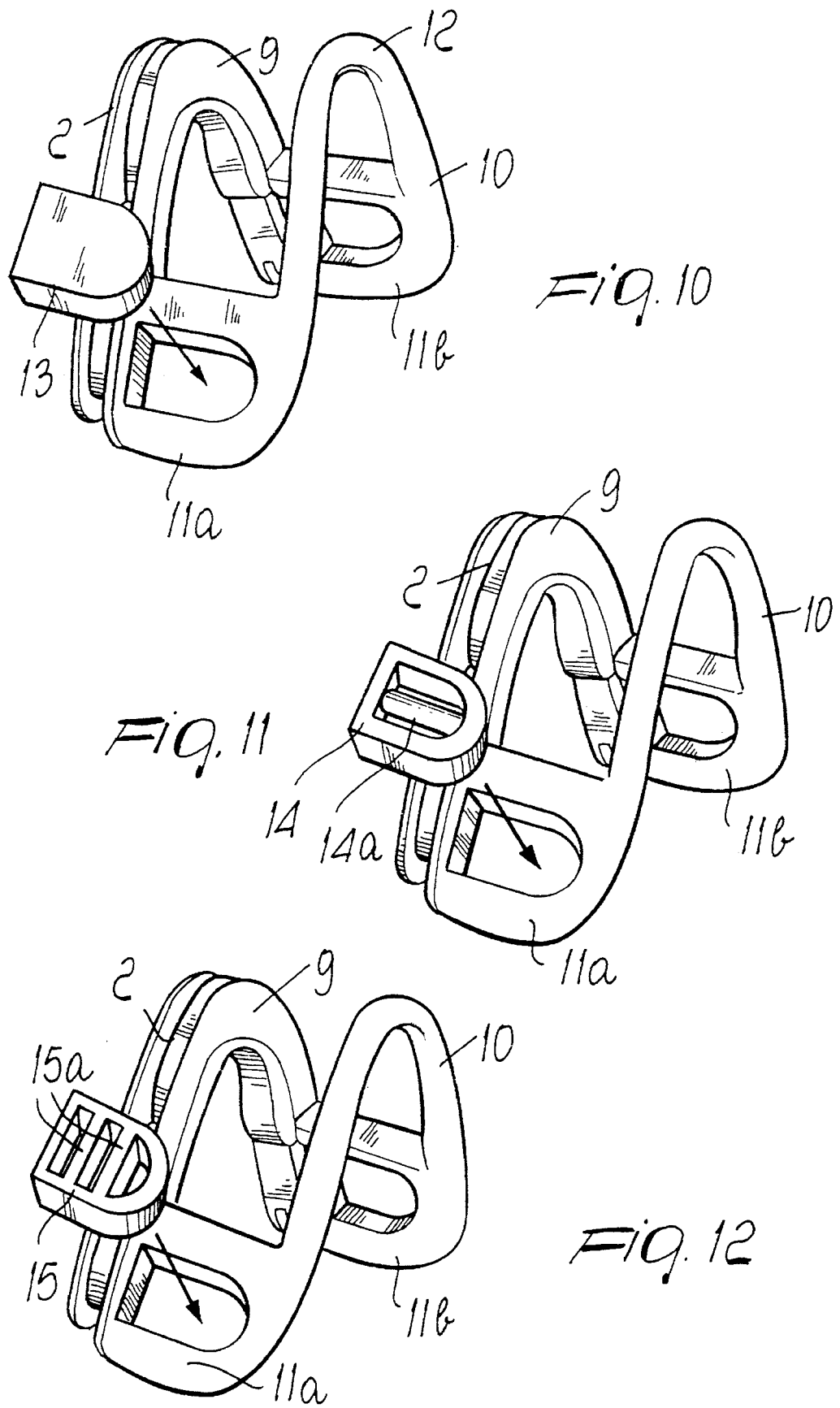

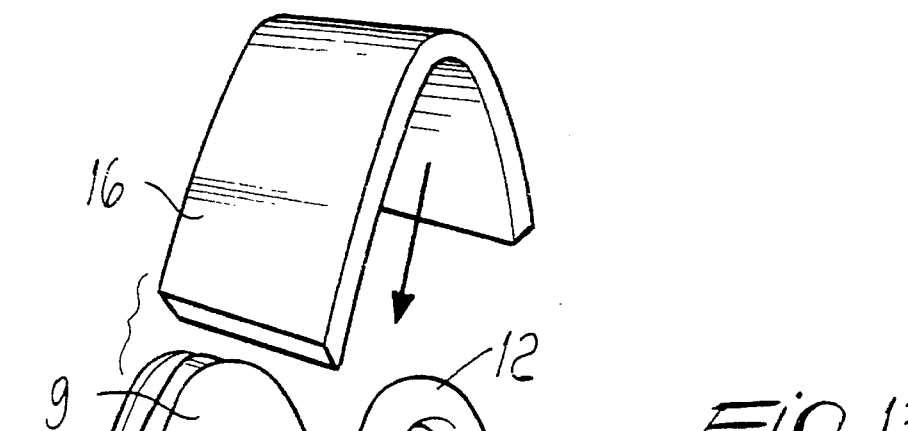
Fig. 13
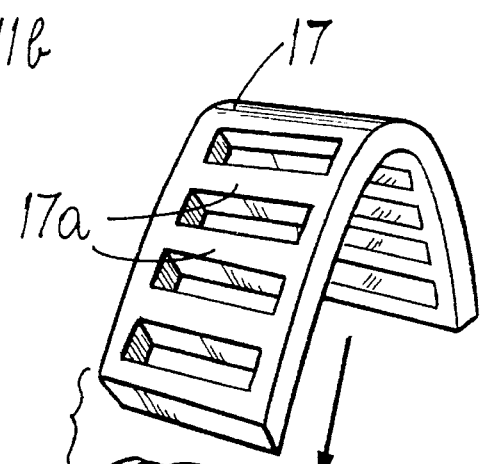
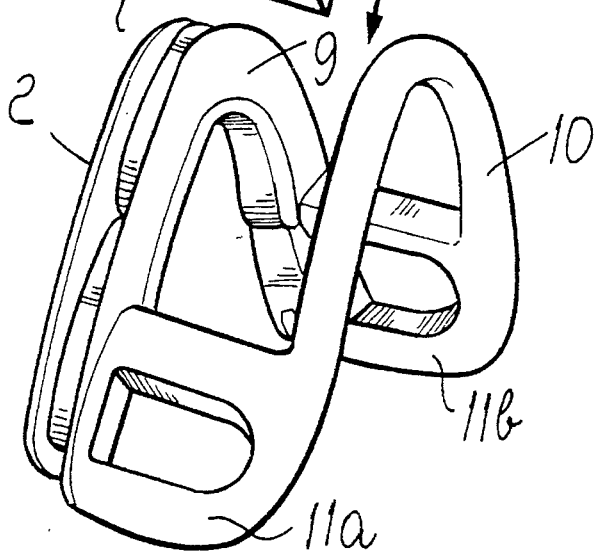
Fig. 14

5,526,070

NOSE PAD PARTICULARLY FOR SPECTACLE FRAMES

BACKGROUND OF THE INVENTION

The present invention relates to a nose pad particularly for spectacle frames.

Especially in sports sunglasses that comprise a single lens or two lenses associated with a front made of plastics, it is nowadays known to associate a nose pad, also preferably made of plastics, at the lens region that lies above the nasal septum.

It is thus known to provide a nose pad which is substantially constituted by a rigid curved element which is substantially shaped like an open triangle and has, at two sides, means such as for example adapted seats for temporary coupling to complementary shaped teeth formed at the single lens or at the lenses.

A soft perimetric band also protrudes at right angles from said known rigid elements towards the face of the user and is meant to rest on the nasal septum and surround it.

However, said conventional nose pads have drawbacks: first of all, this band facilitates perspiration, because it has a large surface in contact with the user's skin.

The optional presence of a slot formed on said band only at the vertex does not solve the problem.

Moreover, again due to its direct interaction with the skin, the band can cause discomfort to the user due to the continuous movements to which the glasses can be subject during use, especially during sports practice.

Furthermore, in case of accidental impact of the glasses the nose pad transmits practically all the forces involved to the nasal septum, thus causing considerable discomfort to the user.

A nose pad is also known in which the band is glued, at its ends, to two rigid pins which in turn protrude from the rigid element: impacts are thus still transmitted from the pins to the user's face.

SUMMARY OF THE INVENTION

The aim of the present invention is therefore to solve the described technical problems, eliminating the drawbacks of the prior art and thus providing a nose pad that has optimum user comfort characteristics and limits perspiration at the nasal septum.

Within the scope of the above aim, another important object is to provide a nose pad that allows to limit the transmission to the nasal septum of any impacts affecting the glasses during use.

Another important object is to provide a nose pad that can still be used in comfort even when the glasses are used during sports practice.

Another object is to provide a nose pad that is structurally simple and has low manufacturing costs.

This aim, these objects, and others which will become apparent hereinafter are achieved by a nose pad particularly for spectacle frames, comprising a curved rigid element which is shaped like an open triangle and has means for temporarily engaging the frames, characterized in that it comprises a first soft element that partially surrounds said rigid element and a second soft element which is associated with, and protrudes from, the ends of said rigid element, said second soft element being elastically deformable towards said first soft element and having approximately the same shape as said rigid element.

BRIEF DESCRIPTION OF THE DRAWINGS

Further characteristics and advantages of the invention will become apparent from the detailed description of a particular but not exclusive embodiment illustrated only by way of non-limitative example in the accompanying drawings, wherein:

FIG. 1 is a perspective view of the nose pad;

FIG. 2 is a front view of the nose pad;

FIG. 3 is a side view of the nose pad;

FIGS. 4, 5, 6, and 7 illustrate the behavior of the second soft element and of the first soft element in case of an accidental impact of the glasses;

FIGS. 10–12 are perspective views of the nose pad according to the invention in which a further elastic element is provided;

FIGS. 13,14 are perspective views of the nose pad acccording to the invention with a different, further elastic element.

DESCRIPTION OF THE PREFERRED EMBODIMENTS

Figure 8:
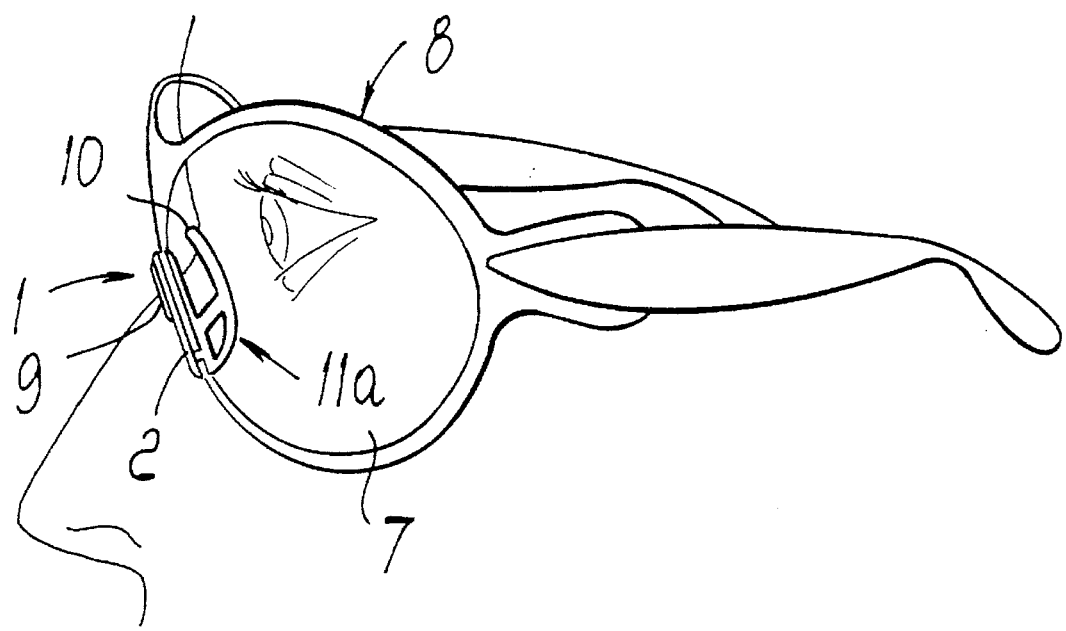
FIG. 8 is a view of an example of the use of the nose pad.
Figure 9:
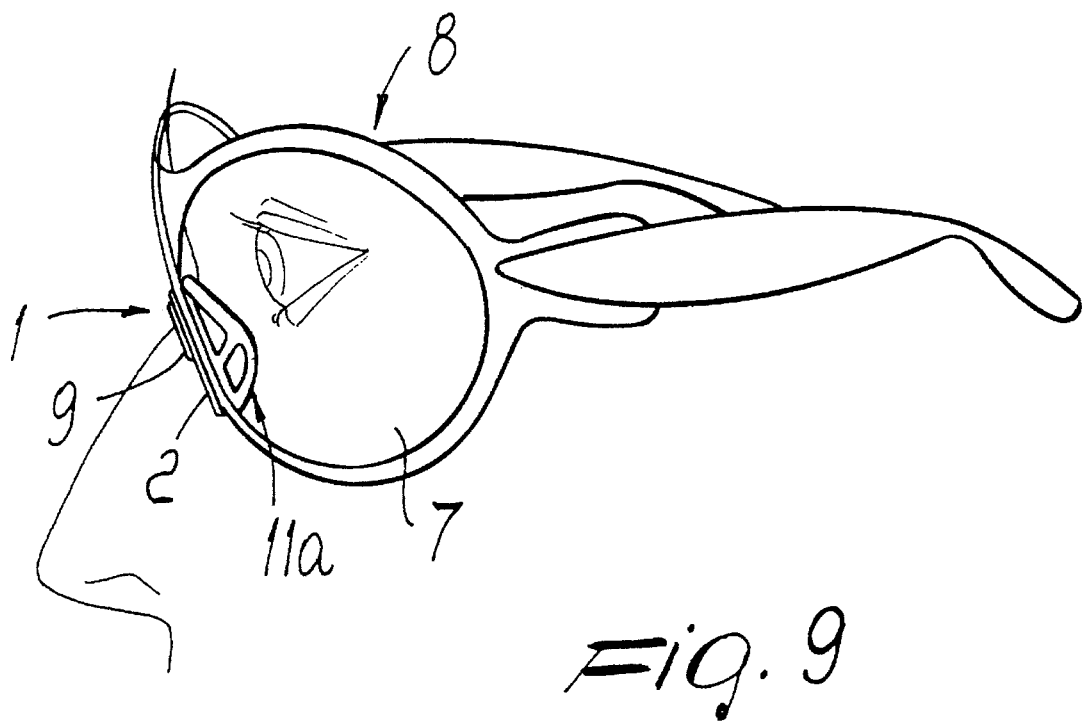
FIG. 9 is a view, similar to the preceding one, of the shape that the nose pad assumes in case of an accidental impact of the glasses.

With reference to the above figures, the reference numeral 1 designates the nose pad, which comprises a rigid element, designated by the reference numeral 2, having an essentially inverted V-shaped configuration (as clearly shown in FIG. 2) delimiting a substantially triangular shape with a rounded vertex 3 and with ends 4a and 4b that are free and can move elastically closer to each other.

Said rigid element 2 has a lateral channel 5 on its outer surface; adapted temporary engagement means, such as seats 6, for complementarily shaped grip means associated at a lens 7 or at a frame 8 of an item of eyewear, are formed at said channel.

The nose pad 1 comprises a first soft element 9 which partially surrounds the rigid element 2 at the surface that lies below the vertex 3 and along part of the length of the sides of said rigid element.

The nose pad also comprises a second soft element 10 which is associated at the ends 4a, 4b of the rigid element 2 at the surfaces that are directed towards the user's face and in the region that lies below the tip of the first soft element 9.

In the preferred embodiment, said second soft element 10, which is also approximately shaped like the rigid element 2 and may have a tubular configuration, is associated with said rigid element by means of an adapted pair of flexible bridges 11a and 11b which protrude at right angles from the rigid element and are such as to place the second soft element 10 approximately parallel to said rigid element 2.

Accordingly, the vertex 12 of the second soft element 10 approximately faces the corresponding vertex of the first soft element 9 and at the same time can flex towards it.

The use of the nose pad is in fact as follows: once it has been associated with the lens or frame, the nasal septum of the user interacts only with part of the first soft element 9 and of the second soft element 10, so that a very small portion of skin is affected.

Moreover, the presence of the pair of bridges, as well as the arrangement of the second soft element 10, allow optimum ventilation of the nasal septum, thus facilitating the use of the glasses even during sports practice.

Furthermore, in case of an accidental impact on the glasses one may observe a behavior shown in FIGS. 4 to 7; FIG. 5 shows that an impact affecting the lens or the frame forces an elastic deformation of the second soft element 10, which tends to move towards the facing first soft element 9.

Accordingly, the second soft element 10 can perform a wide stroke and is thus an element adapted to cushion impacts.

Should the second soft element 10 make contact with the first soft element 9, there would be further impact cushioning, and if the impact is considerable, the forces would be further dissipated since the first soft element can rotate about the rigid element 2, as shown in FIG. 7.

In case of impact, therefore, the second soft element 10 acts as a leaf spring, whereas the first soft element 9 helps to further cushion impacts in case of contact with the second soft element 10, constituting an abutment for said second soft element.

To withstand even the strongest impacts in a different embodiment of the invention (shown in FIGS. 10–12), there is provided a further elastic element 13–15 to be inserted under the flexible bridges 11a, 11b, between the second soft element 10 and the rigid element 2.

Such a further elastic element can be shaped as a plug 13–15 and made of plastics or other appropriate, elastic material.

To enhance its elastic performance, the plug 14, 15 can be shaped hollow and have internal ribs 14a, 15a (see FIGS. 11 and 12).

The further elastic element can be also shaped as a strip 16, 17 (see FIGS. 13, 14) and placed between the first soft element 9 and the second soft element 10. The strip 16, 17 can be made of plastics or other appropriate elastic material and shaped as a solid strip 16 or be hollow as in 17. In the latter case, internal ribs 17a are provided in the cavity formed inside the strip 17.

It has thus been observed that the invention has achieved the intended aim and objects, a nose pad having been provided that allows on one hand to improve comfort for the user, as the skin surface in contact with the first and second soft elements is limited and optimum ventilation is allowed, so as to allow to use the glasses even during sports practice.

In case of impact, the nose pad furthermore allows to compensate for said impact without transmitting it to the nasal septum by virtue of the elastic deformation of the second soft element and of the further deformation that can be applied to the first soft element if it abuts against said second soft element.

The invention is furthermore structurally very simple and can also be applied to conventional spectacle frame types, as it is sufficient to replace the rigid element applied to said conventional spectacles.

Advantageously, said first and second soft elements are molded in place on said rigid element in a single step.

The nose pad according to the invention is naturally susceptible of numerous modifications and variations, all of which are within the scope of the same inventive concept.

The materials and the dimensions that constitute the individual components of the nose pad may of course be the most pertinent according to the specific requirements.

What is claimed is:

1. Nose pad for an item of eyewear comprising;
   a curved rigid element having a substantially V-shaped configuration and defining ends;
   connection elements connected to said curved rigid element for temporarily engaging an item of eyewear;
   a first soft element connected to and partially surrounding said rigid element;
   a second soft element connected to said ends of said rigid element, said second soft element extending substantially parallel to said rigid element and being elastically flexible towards said first soft element.

2. Nose pad according to claim 1, wherein said connection elements comprise a lateral channel defined externally on said curved rigid element, and seats formed within said lateral channel.

3. Nose pad according to claim 1, further comprising bridge-like members interconnecting said curved rigid element and said second soft element.

4. Nose pad according to claim 3, wherein said bridge-like members comprise a pair of flexible bridges protruding from said ends of said curved rigid element and connected to said second soft element.

5. Nose pad according to claim 4, further comprising elastic plugs insertable between said curved rigid element and said second soft element beneath each of said pair of flexible bridges.

6. Nose pad according to claim 5, wherein said elastic plugs comprise hollow elastic plugs.

7. Nose pad according to claim 6, wherein each of said hollow elastic plugs has at least one internal rib.

8. Nose pad according to claim 1, further comprising an elastic strip interposed between said first soft element and said second soft element.

9. Nose pad according to claim 8, wherein said elastic strip comprises a solid elastic strip.

10. Nose pad according to claim 8, wherein said elastic strip comprises a hollow elastic strip.

11. Nose pad according to claim 10, wherein said hollow elastic strip has a plurality of internal ribs.

12. Nose pad for an item of eyewear comprising;
    a curved rigid element having a substantially V-shaped configuration defining a rounded vertex and two ends;
    connection elements connected to said curved rigid element for temporarily engaging grip means connected to an item of eyewear;
    a first soft element having a shape corresponding to said substantially V-shaped configuration of said curved rigid element, said first soft element being connected to and partially surrounding said rigid element at a portion thereof adjacent to said rounded vertex;
    a second soft element extending substantially parallel to said rigid element, said second soft element having a vertex located opposite said rounded vertex of said curved rigid element, and;
    flexible bridge members interposed between said ends of said curved rigid element, said vertex of said second soft element being elastically flexible towards said first soft element and said rounded vertex of said curved rigid element.

13. Nose pad according to claim 12, further comprising elastic plugs insertable between said curved rigid element and said second soft element beneath each of said flexible bridge members.

14. Nose pad according to claim 13, wherein said elastic plugs comprise hollow elastic plugs.

15. Nose pad according to claim 14, wherein each of said hollow elastic plugs has at least one internal rib.

16. Nose pad according to claim 12, further comprising an elastic strip interposed between said first soft element and said second soft element.

17. Nose pad according to claim 16, wherein said elastic strip comprises a solid elastic strip.

18. Nose pad according to claim 16, wherein said elastic strip comprises a hollow elastic strip.

19. Nose pad according to claim 18, wherein said hollow elastic strip has internal ribs.

* * * * *